3,745,027
IMMERSION COOKING IN A STABILIZING SOLUTION COMPRISING POLYHYDRIC ALCOHOL
Milton Kaplow, White Plains, and Joseph J. Halik, Yonkers, N.Y., assignors to General Foods Corporation, White Plains, N.Y.
No Drawing. Continuation of abandoned application Ser. No. 684,551, Nov. 20, 1967. This application Nov. 27, 1970, Ser. No. 93,510
Int. Cl. A23b 1/03, 1/12, 7/02, 7/08, 7/10, 1/14
U.S. Cl. 99—199                                                    5 Claims

ABSTRACT OF THE DISCLOSURE

Immersion cooking food in a polyhydric alcohol solution preserves the food and imparts moist eating qualities thereto.

---

This application is a continuation of Ser. No. 684,551, filed on Nov. 20, 1967, now abandoned.

This invention relates to a new and improved process for the cooking or other such heat treatment of fresh or partially dehydrated plant and animal tissue. More particularly, the invention is concerned with a new and improved process for the heat treatment of food such as fruits, vegetables and meats, under conditions wherein the product is converted to an edible form while being collaterally stabilized against microorganic decomposition.

Heretofore, food products such as fresh vegetables have been cooked in an excess of water primarily; during cooking the food undergoes an enzymatic inactivation and, depending upon desired organoleptic qualities, will be further heat treated in the presence of such water excesses to soften or otherwise further alter the physical or chemical state of the food; such alteration would be commonly classed as gelatinization in the case of high starch-containing food; fresh meat products might be "boiled" in which process the meat will undergo tendering depending upon the extent of heat treatment. Such cooking operations do not given rise to any significant change in the microorganic stability of the foodstuff per se such as would permit its storage and packaging other than by some commercial sterilization (canning) technique. Canning procedures may require prolonged heating to kill spores of anaerobic bacteria which in the case of comparatively unacidified meats and vegetables may be so prolonged as to cause a most undesirable loss of flavor and/or texture. Preservation without resort to commercial sterlization packaging techniques would expand the marketability of such produce, providing versatility in packaging and distribution.

The present invention has, as its primary object, the treatment of such produce as fresh fruits, vegetables and meat under conditions wherein the "cooked" character of the product in an edible form is not materially different from that now recognized as acceptable and so has a "moist" eating quality, but which is advantageously treated to cause the produce to be essentially stable against microorganic decomposition, such that the need for any further treatment to provide bacteriostasis and protection against development of yeast and/or molds is avoided.

Briefly stated, the present invention involves the treatment of foods, having a moisture content substantially approximating their pristine condition and typically in excess of 50% moisture, by immersing same in a cooking solution containing at least 5% polyhydric alcohol, and preferably high in concentration of other stabilizing solutes, selected from a class consisting of sugars, salts and mixtures thereof; the solution will typically contain glycerol as the preferred polyhydric alcohol, and treatment in the solution will be for a sufficient period of time to at least thermally deactivate any latent enzymatic and pathogenic activity. The solution of use in accordance with the present invention is employed in an excess amount to immersion cook the foodstuff and cause it to undergo a water substitution by the stabilizing solution, such that the aforesaid polyhydric alcohol and preferably the sugars, and/or salts as well, replace a substantial and usually a major part of the percent by weight of the original moisture content of the food, until such time as the food itself has been caused to undergo a moisture reduction to between 15–45%, more typically, 25–35%. In this condition, the polyhydric alcohol will generally infuse the produce at a weight level in excess of 5% and will generally be present at a level usually in excess of the moisture level, although lower levels of polyhydric alcohol will be practical at terminal produce moistures below 20%; in this latter instance the level of polyhydric alcohol will commonly exceed 10% and be complemented by other stabilizing solutes to be hereinafter described.

Cooking is carried out by immersing the foodstuff in an excess of heated cooking solution, which solution per se, has a moisture content essentially less than the major weight percent of the stabilizing solutes therein and less than the intended final moisture in the food. The relative concentration of the polyhydric alcohols and the surgars and/or salts solutes of use in accordance with the invention will in large measure be dictated by the flavor requirement for the food being so treated. In the case of fruits such as apples, it may be desirable to employ a higher concentration of sugars than in the treatment of meats and vegetables; in the case of produce such as carrots, the use of a significant amount of stabilizing sugars will be practical, since this will not be offensive to taste.

The process therefore essentially results in dehydration, wherein moisture present in the food is progressively depleted and at least partially substituted for by the polyhydric alcohol; the polyhydric alcohol infusion in combination with the moisture retained provides desired softness and pliability to the food for organoleptic acceptability, and imparts a sensation of moistness that is quite reminiscent of higher moisture cooked foods despite the moisture reduction produced. The polyhydric alcohol or mixtures thereof, such as glycerol, per se, or glycerol mixed with other polyhydric alcohols as will be hereinafter set forth, serves as stabilizing solute in conjunction with any sugar and/or salt present, and necessarily is present with such other solutes in a sufficient concentration to substantially increase the osmotic pressure of the resulting solution infused in the food solids. By immersing the foodstuffs in an excess of the stabilizing solution, any sugar and/or salt in solution are also infused together with the polyhydric alcohol to effectively permeate the foodstuff in a practical period of time, the extent of infusion being dependent upon the morphology of the food itself.

Treatment by the stabilizing solution will preferably involve an initial "cook" wherein such solution will be elevated in temperature above 160° F. and the foodstuff immersed therein for at least 5 minutes and preferably for at least a more prolonged period, say 10 to 15 minutes, until the degree of cooking or heat treatment required for softening and microorganic inactivation takes place; during this operation not all of the stabilizing solute needed to achieve bacteriostasis may migrate throughout the food and so a continued immersion in the stabilizing solution will be called for until such time as the requisite concentration of such solutes in the food is effected. In the case of most food that has been cooked, say for 15 minutes, in the stabilizing solution, it may be allowed to stand for anywhere from 2 to 4 hours and higher until such time as the stabilizing solutes—say a glycerol or a glycerol-salt-sugar solution—will penetrate and infuse the interior of the produce and be present in this diffused state in a sufficient concentration, relative to water present, that microorganic stability is obtained.

During this entire immersion treatment the polyhydric alcohol will serve to deplete the moisture content of the foodstuffs by substituting for a portion of the moisture present in the interior of bean, fruit, vegetable or meat and causing moisture transfer to the exterior thereof.

The rate of infusion will be determined by the concentration of polyhydric alcohol and any salt and/or sugar solutes in the stabilizing solution, the higher the concentration of these solutes the greater the rate of infusion thereof, and hence the less the period required to effect substitution of water in the foodstuff by the polyhydric alcohol. The concentration of such solutes in the cooking solution and the cooking time will be predetermined by the requisite terminal moisture in the produce, such moisture being dictated by the stability and texture requirement for the produce.

The process will find its widest application to the treatment of fresh vegetables and raw meats which are destined to be packed aerobically, i.e., cold packed under less than commercial sterilization conditions. Thus, a meat such as beef or a fresh vegetable such as carrots, peas and the like, will be "boiled" by immersion in an excess of the cooking solution, in accordance with the present invention for that period of time required to essentially inactivate any latent enzymic activity and any pathogens that may be present. Preferably this will be for a period of time usually exceeding 5 minutes at a temperature in excess of 180° F. and more commonly in the neighborhood of 200° F. for, say 15 to 30 minutes, or until the food has been cooked. Thereafter, the meat or vegetable may be further immersed for a protracted period of time depending upon the relative concentration of polyhydric alcohol, salt and/or sugar solutes and the target terminal moisture desired for microorganic stability. Foods so treated will offer a desirable texture and flavor approaching that of food which has been cooked by immersion in boiling water. Advantageously, the polyhydric alcohol substituted for water naturally occurring will provide a plasticity and softening of texture to the produce and act in combination with the balance of moisture left in the foods such that the produce can be eaten "as is," rewarmed or immersed in an excess of water for further moistening preparatory to consumption.

The term "polyhydric alcohol" refers to alcohols with two or more hydroxyl groups. Although it is intended to include the most typical such alcohols, namely, glycerol, sorbitol, mannitol, propylene glycol and mixtures thereof, the term also applies to a variety of sugar alcohols which may be classed by the number of hydroxyl groups in the general formula, HOCH(CHOH)nCHCH, where $n$ has values from 2 to 5, like tetritols, penitols, hexitols, heptitols, etc., as well as stereo-isomers thereof. In general, these polyols are water-soluble, crystalline compounds with small optical rotations in water and have a slightly sweet to a very sweet taste. Among the typical alcohols of use in the present invention are:

tetritols
    erythritol
    D-threitol
    L-threitol
    D,L-threitol
pentitols
    ribitol
    xylitol
    D-arabitol
    L-arabitol
hexitols
    allitol
    dulcitol
    sorbitol (D-glucitol)
    L-glucitol
hexitols
    D,L-glucitol
    D-mannitol
    L-mannitol
    D,L-mannitol
    D-talitol
    L-talitol
    D,L-talitol
    D-iditol
    L-iditol
heptitols
    glycero-gulo-heptitol
    D-glycero-D-ido-heptitol
    perseitol
    volemitol
octitol
    D-erythro-D-galacto-octitol The polyhydric alcohols should be of a low molecular weight so as to offer a substantial effect in increasing the osmotic pressure of the solution thereof contained in the food.

In general the polyhydric alcohols of use in the present invention will be employed at a level in solution such that, upon completion of the treatment, the end product will have well in excess of 5% polyhydric alcohol therein; this level is to some extent established by the level of other stabilizing solutes used in the cooking solution and the terminal moisture content of the product being so treated. As the level of sugar and/or salt in the cooking solution increases, the level of polyhydric alcohol that might otherwise be employed therein, all other things being equal, will be reduced. As the terminal moisture target for the product is lowered, the level of polyhydric alcohol in solution with other solutes needed to effect requisite substitution for moisture in the foodstuff will be increased. The polyhydric alcohol level in the cooking solution will always exceed the moisture present in the cooking solution particularly in product having moisture levels in excess of 25%.

It is a feature of the present invention that cooking by the stabilizing solution and treatments that are effected thereby and thereafter of the foodstuff are carried out in an excess of the cooking liquid; the stabilizing solution constitutes at least a major percent by weight of the foodstuff and more commonly will be employed at a level in excess of this ration. A typical weight level of solution to foodstuff will range between 1½:1 to 4:1 and above. The primary objective is to effect dilution of the original moisture content of the product through the partial substitution therefor by the polyhydric alcohol, in a time period commensurate with that degree of heat treatment needed to effect the chemical and physical changes manifested in terms of softness of texture, and overall desirable eating qualities, without an undesirable loss in food solids. Using any level of cooking solution less than the weight level of the foodstuffs being treated, as a general proposition, will require some preliminary dehydration of the foodstuff in order to effect the ultimate desired substitution of glycerol or other such polyhydric alcohol for moisture in the product concomitant with microorganic stability requirements; since such preliminary dehydration gives rise in many applications to a loss of desired turgor or other change in the morphology of the food product's texture, such preliminary dehydration is less desired.

Preferably it will be practical to treat the foodstuff in the essentially raw or semi-blanched state at a moisture content in excess of 60%, and approaching its pristine moisture level, at an elevated temperature essentially above 160° F. and more commonly above 180° F. for a period of at least 10 minutes and, more commonly, of at least 15 to 20 minutes, whereby any latent enzyme activity or unstabilizing color, flavor and microorganic instability precursors will be inactivated. After most foods have been softened by elevated heat treatment in the stabilizing solution, further distribution of stabilizing solutes can be carried out, usually at temperatures below 160° F., if the produce is allowed to reside in the solution for a sufficient period of time. It will not be necessary, therefore, to carry out cooking in accordance with this invention for a period greater than 60 minutes, although it would still be within the inventive precepts to practice a more prolonged cooking in order to diffuse stabilizing solutes throughout the matrix of the foodstuff and complete the desired water substitution thereby.

It is a feature of this invention that as cooking proceeds, natural and desirable constituents normally lost to a larger extent in conventional immersion cooking, are not lost to the same degree in many applications. When fresh vegetables such as carrots are immersion cooked in the polyhydric alcohol the flavor and color values therein are retained to a greater degree than when such vegetables are cooked in an excess of water under comparable conditions. In the case of meat it will be noted that as cooking proceeds there is less of a noticeable loss of meat-like aromas and the final stabilized meat will possess many desired flavors that might otherwise be lost in cooking.

Advantageously the stabilizing solution can be reused a plurality of times to cook successive portions of fresh produce while imparting thereto any desired flavors that might be intentionally retained in the cooking liquor, the water concentration of the cooking solution being readjusted so as to assure a high level of stabilizing sugars and solutes as well as polyhydric alcohol for infusion.

Although the invention will find its greatest application in those instances where the food is cooked incident to infusing the stabilizing solution, it is not essential that the entire cooking or heat treatment necessary to infuse the stabilizing solution take place at an elevated temperature; in some applications the food may be partially cooked or at least blanched before being so treated. Thus in the case of apples, peeled apple slices may be partially cooked for, say 5 to 10 minutes, to soften before infusion of stabilizing solution. In general, however, it will be found that after such a preliminary cooking or other such treatment, it will be essential to complete the cooking by the infusion process of the present invention in order to effect the requisite substitution of polyhydric alcohol and other stabilizing solutes for at least part of the moisture present, the produce being immersed in any event during and after such cooking until a terminal moisture content less than 45% is achieved.

Products stabilized by the present process will generally be of two types. The first type will be products destined for consumption as such, being merely warmed in those instances where heat enhances the acceptability of the product. The second type will be those which are intended to be mixed with other foods and further hydrated to undergo a desirable reduction in concentration of solutes present with the food; representative of the latter class of foods will be stabilized meat cuts or vegetables intended for dilution as part of a soup or other fluid preparation, wherein the solutes are desirably at a lesser concentration for organoleptic acceptability.

Adjunctive stabilizing sugars and salt mixtures of use will be typified by such materials as sucrose, dextrose and higher sugars on the one hand, and sodium chloride and other salts on the other hand. The term sugar refers to any of a number of useful saccharide materials which are capable of increasing the osmotic pressure of the water in which they are dissolved and thereby giving rise to the requisite bacteriostatic effect. Included on the list of useful sugars are the non-reducing and reducing water-soluble monosaccharides and the reducing and non-reducing polysaccharides and their degradation products; e.g., pentoses, including aldopentoses, methylpentoses, keptopentoses, like xylose and arabinose; a deoxyaldose like rhamnose, hexoses and reducing saccharides such as aldohexoses like glucose, galactose and mannose; the ketohexoses, like fructose and sorbose; disaccharides, like lactose and maltose; non-reducing disaccharides such as a sucrose and other polysaccharides such as dextrin and raffinose; and hydrolyzed starches which contain as their constituents oligosaccharides. The sugars should also be of a low molecular weight so as to offer a substantial effect in increasing the osmotic pressure of the sugar solution.

The preferred salt of use herein will be any readily ionizable low molecular weight compound which increases osmotic pressure in the solution, such that the total solution has a significant increase in ability to provide bacteriostasis and overall microorganic stability. Typical of those salts of use in accordance with this invention are: sodium chloride, calcium chloride, sodium phosphate, trisodium citrate and like inorganic and organic acid salts commonly used in foodstuffs. However, other salts of higher molecular weight and not as readily ionized may also be employed with generally lesser effect, e.g., organic salts such as alkali metal acetates, oleates and other food acid salts.

The following are operative examples of products stabilized to the extent that they can be cold- or hot-packed in a hermetic or non-hermetic container indefinitely (typically for 3–12 months).

EXAMPLE 1

Immersion cook infusion of fresh chicken

Chicken pieces (½–1″ dimensions) were immersion cooked (210–220° F.) for 15 minutes in the stabilizing solution described below and soaked for six hours therein under refrigeration and drained. Chicken so prepared had acceptable eating qualities when eaten cold or when warmed.

FORMULA FOR IMMERSION COOK INFUSION OF FRESH CHICKEN

|  | Percent | |
|---|---|---|
|  | Solution | Final product |
| Fresh chicken solids | | 40.0 |
| Glycerol | 71.5 | 29.7 |
| Water | 16.7 | 25.3 |
| Chicken soup base (including salt, sugar, monosodium glutamate) | 8.9 | 3.7 |
| Propylene glycol | 2.2 | 1.0 |
| Potassium sorbate | .7 | .3 |
| Total | 100.0 | 100.0 |

NOTE.—Preparation used 100 gm. fresh chicken and 164 gm. solution.

EXAMPLE 2

Immersion cook infusion of fresh carrots

Diced carrots (⅜ x ⅜ x 3/16″) were cooked (210–220° F.) for 15 minutes in the following stabilizing solution and soaked for six hours therein under refrigeration and drained. Carrots so prepared had acceptable eating qualities and microorganic stability.

FORMULA FOR IMMERSION COOK INFUSION OF FRESH CARROTS

|  | Percent | |
|---|---|---|
|  | Solution | Final product |
| Glycerol | 88.6 | 46.4 |
| Water | 5.6 | 35.5 |
| Fresh carrot solids | | 15.1 |
| Salt (NaCl) | 3.7 | 1.9 |
| Propylene glycol | 1.6 | .8 |
| Potassium sorbate | .5 | .3 |
| Total | 100.0 | 100.0 |

NOTE.—Preparation used 100 gm. fresh carrots and 142 gm. solution.

EXAMPLE 3

Immersion cook infusion of fresh coarse ground beef

Chuck hamburger was cooked (210–220° F.) for 15 minutes in the stabilizing solution listed below and soaked for six hours therein under refrigeration, reheated to 210° F. and drained.

Coarse ground beef prepared by this immersion-cook infusion method (following formula) had acceptable eating qualities and microorganic stability.

FORMULA FOR IMMERSION COOK INFUSION OF FRESH COARSE GROUND BEEF

|  | Percent | |
|---|---|---|
|  | Solution | Final product |
| Fresh beef solids | | 37.7 |
| Glycerol | 65.6 | 27.2 |
| Water | 15.6 | 25.8 |
| Beef soup base solids (containing salt, sugar, monosodium glutamate) | 11.9 | 5.0 |
| Propylene glycol | 6.0 | 2.4 |
| Potassium sorbate | .9 | .4 |
| Total | 100.0 | 100.0 |

NOTE.—Preparation used 100 gm. raw chuck hamburger and 133 gm. solution.

EXAMPLE 4

Immersion cook infusion of fresh potato

Potato pieces (½–1″ dimensions) were cooked (210–220° F.) for 10 minutes in the following stabilizing solution, soaked for six hours therein under refrigeration and drained. Potato prepared by the immersion cook infusion method had acceptable eating qualities and microorganic stability.

FORMULA FOR IMMERSION COOK INFUSION OF FRESH POTATOES

|  | Percent | |
|---|---|---|
|  | Solution | Final product |
| Glycerol | 78.0 | 38.8 |
| Water | 14.6 | 29.2 |
| Potato solids | | 28.2 |
| Salt (NaCl) | 5.2 | 2.6 |
| Propylene glycol | 1.7 | .9 |
| Potassium sorbate | .5 | .3 |
| Total | 100.0 | 100.0 |

NOTE.—Preparation used 100 gm. fresh potato and 182 gm. of solution.

EXAMPLE 5

Immersion cook infusion of fresh peas

Fresh peas, with and without piercing of the outer membrane, were cooked (210–220° F.) for 15 minutes in the stabilizing solution listed below and soaked for six hours in the same liquid under refrigeration and drained.

Peas prepared by the immersion cook infusion method (following formula) had acceptable eating qualities and microorganic stability.

The pierced membrane peas were somewhat more uniformly spherical in shape.

FORMULA FOR IMMERSION COOK INFUSION OF FRESH PEAS

|  | Percent | |
|---|---|---|
|  | Solution | Final product |
| Water | 28.0 | 43.2 |
| Glycerol | 63.2 | 37.9 |
| Pea solids | | 13.8 |
| Salt (NaCl) | 5.0 | 2.9 |
| Propylene glycol | 3.3 | 2.0 |
| Potassium sorbate | .5 | .2 |
| Total | 100.0 | 100.0 |

NOTE.—Preparation used 100 gm. fresh peas with 186 gm. solution.

EXAMPLE 6

Immersion cook infusion of fresh apple

Fresh apple wedges (approximately ½ inch thick) were cooked (210–220° F.) for six minutes in the following stabilizing solution and soaked for six hours therein under refrigeration and drained.

The so-prepared apple wedges had desirable eating properties and acceptable microorganic stability.

FORMULA FOR IMMERSION COOK INFUSION OF FRESH APPLE

|  | Percent | |
|---|---|---|
|  | Solution | Final product |
| Sucrose | 46.20 | 33.47 |
| Water | 14.00 | 26.40 |
| Glycerol | 36.12 | 25.30 |
| Apple solids | | 12.20 |
| Propylene glycol | 2.90 | 2.08 |
| Potassium sorbate | .44 | .31 |
| Calcium chloride | .30 | .21 |
| Sodium meta-bisulfite | .04 | .03 |
| Total | 100.00 | 100.00 |

NOTE.—Preparation used 100 gm. fresh apple wedges with 366 gm. solution.

All of the above preparations were infused with a potassium sorbate which serves as an antimycotic therein. The stabilizing solution will perferably contain such an antimycotic when product terminal moisture is at a comparatively high moisture level in the aforesaid 15–45% range and generally has a moisture content in excess of 20%, the need for and the level of antimycotic being dependent upon the level of total solutes infused. At a high solute infusion level, such as when the level is substantially in excess of the product moisture level, an antimycotic need not be employed. Generally any antimycotic may be used such as sorbic, propionic, benzoic acids and their salts and esters.

What is claimed is:
1. A process for the preservation of foods comprising meat, fruit and vegetables consisting of:
  (a) immersion cooking the food in an aqueous microbiologically stabilizing solution for a period of time sufficient to deplete the moisture in the food to 15–45% of the food weight, said microbiologically stabilizing solution having a weight of from 1.5 to 4 times the weight of the food and consisting essentially of an aqueous solution of
    (1) polyhydric alcohol selected from the group consisting of glycerol, sorbital, mannitol, propylene glycol and mixtures thereof in an amount ranging from about 25% to about 90% by weight of the stabilizing solution,
    (2) solutes comprised of mixtures of sucrose, dextrose and edible organic and inorganic salts, and
    (3) an antimycotic agent selected from the group consisting of sorbic, propionic, benzoic acids and their salts and esters in an amount ranging from about 0.5% to about 1.0%, wherein the moisture content of said stabilizing solution is less than that of the food being treated and the stabilizing solution infuses the food and replaces a major weight percentage of the original moisture present in the food and the polyhydric alcohol is caused to be present in the thusly treated food at an effective level ranging from about 10% to about 40% of the weight thereof to impart microbiological stability to said food, and
  (b) separating the thusly treated food from the resulting water enriched stabilizing solution whereby the food has a moist eating quality and is caused to be essentially stable against microorganic decomposition, such that the need for any further treatment to provide bacteriostasis and protect against development of yeast and/or molds is avoided.

2. Process of claim 1 wherein the treatment involves immersing of the food in the solution at a temperature of at least 160° F. for a time period in excess of 10 minutes, the stabilizing solution being a major percent by weight of the food being treated.

3. Process of claim 1 wherein the foodstuff is blanched prior to such treatment.

4. Process of claim 1 wherein the food is treated in said solution at a temperature less than 160° F. for a period sufficient to effect the desired infusion of solutes therein after being initially treated at a temperature above 160° F.

5. Process of claim 1 wherein the polyhydric alcohol is glycerol.

References Cited

UNITED STATES PATENTS

| | | | |
|---|---|---|---|
| 2,354,495 | 7/1944 | Bodensteins | 34—9 |
| 2,420,517 | 5/1947 | Brandner | 34—9 |
| 3,202,514 | 8/1965 | Burgess | 99—107 |
| 3,275,452 | 9/1966 | Allen | 99—107 |
| 3,281,251 | 10/1966 | Templeton | 99—204 |
| 3,337,349 | 8/1967 | Savage | 99—204 |

OTHER REFERENCES

Analysis of Foods, Winton, p. 56, John Wiley & Sons Inc., New York, 1945.

NORMAN YUDKOFF, Primary Examiner

M. G. MULLEN, Assistant Examiner

U.S. Cl. X.R.

99—154, 156, 157, 159, 204, 207, 208

UNITED STATES PATENT OFFICE
CERTIFICATE OF CORRECTION

Patent No. 3,745,027        Dated  July 10, 1973

Inventor(s) Milton Kaplow and Joseph J. Halik

It is certified that error appears in the above-identified patent and that said Letters Patent are hereby corrected as shown below:

In Column 1, following the paragraph entitled "Abstract of the Disclosure" add the following paragraph:

--- The invention herein described was made in the course of or under a contract with the U.S. Army Natick Laboratories. ---

In Column 1, line 61, pluralize "yeast".

In Column 2, line 24, change "surgars" to --- sugars ---.

In Column 8, line 42, change "sorbital" to --- sorbitol ---.

Signed and sealed this 18th day of December 1973.

(SEAL)
Attest:

EDWARD M. FLETCHER, JR.                RENE D. TEGTMEYER
Attesting Officer                      Acting Commissioner of Patents